(12) United States Patent
Choi (10) Patent No.: US 6,854,108 B1
(45) Date of Patent: Feb. 8, 2005

(54) METHOD AND APPARATUS FOR DETERMINISTIC REPLAY OF JAVA MULTITHREADED PROGRAMS ON MULTIPROCESSORS

(75) Inventor: Jong-Deok Choi, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/569,308

(22) Filed: May 11, 2000

(51) Int. Cl.[7] .................................................. G06F 9/44
(52) U.S. Cl. ........................... 717/125; 714/38; 714/39
(58) Field of Search ............................... 717/124, 125, 717/128, 130, 152; 714/39

(56) References Cited

U.S. PATENT DOCUMENTS

| | | | | |
|---|---|---|---|---|
| 5,339,415 | A | * 8/1994 | Strout et al. | 709/102 |
| 6,006,247 | A | * 12/1999 | Browning et al. | 709/102 |
| 6,101,524 | A | * 8/2000 | Choi et al. | 709/102 |

OTHER PUBLICATIONS

Choi, Jong–Deok and Stone, Janice M., "Balancing Runtime and Replay Costs in a Trace–and–Replay System", 1991, p. 26–35 retrieved from ACM Portal database Sep. 16, 2003.*

Netzer, Robert H., and Miller, Barton P., "Optimal Tracing and Replay for Debugging Message–Passing Paralled Programs", 1992, IEEE, retrieved Sep. 16, 2003.*

Russinovich, Mark and Cogswell, Bryce, "Replay for Concurrent Non–Deterministric Shared–Memory Applications", p. 258–266, ACM 1996.*

Jong–Deok Choi and Harini Srinivasan, 1998 ACM SIGMETRICS Symposium on Parallel andDistributed tools (SPDT), Aug. 1998, pp. 48–59.

R. Curtis and L. Wittie, "BUGNET: A Debugging System for Parallel Programming Environments", pp. 394–399, 1982, IEEE Journal.

* cited by examiner

*Primary Examiner*—Tuan Dam
*Assistant Examiner*—Mary Steelman
(74) *Attorney, Agent, or Firm*—Richard Ludwin, Esq.; McGinn & Gibb, PLLC (57) ABSTRACT

A method (and apparatus) of determinstically replaying an observable run-time behavior of distributed multi-threaded programs on multiprocessors in a shared-memory multiprocessor environment, wherein a run-time behavior of the programs includes sequences of events, each sequence being associated with one of a plurality of execution threads, includes identifying an execution order of critical events of the program, wherein the program includes critical events and non-critical events, generating groups of critical events of the program, generating, for each given execution thread, a logical thread schedule that identifies a sequence of the groups associated with the given execution thread, and storing the logical thread schedule for subsequent reuse.

35 Claims, 3 Drawing Sheets

METHOD AND APPARATUS FOR DETERMINISTIC REPLAY OF JAVA MULTITHREADED PROGRAMS ON MULTIPROCESSORS

CROSS-REFERENCE TO RELATED APPLICATIONS

The present application is related to U.S. patent application Ser. No. 08/956,717, filed on Oct. 23, 1997, to Choi et al., entitled "DETERMINISTIC REPLAY OF MULTI-THREADED APPLICATIONS", and to U.S. patent application Ser. No. 09/520,008, filed on Mar. 6, 2000, to Choi et al., entitled "DETERMINISTIC REPLAY OF in JAVA MULTITHREADED PROGRAMS ON MULTIPROCESSORS", both assigned to the present assignee, and incorporated herein by reference.

BACKGROUND OF THE INVENTION

1. Field of the Invention

The present invention generally relates to computer processing systems, and more particularly to tools, techniques and processes, such as debugging tools and visualization tools, for deterministically replaying the execution of distributed, multithreaded programs (e.g., JAVA™) on such computer processing systems in a multiprocessor environment.

2. Description of the Related Art

Modern operating system platforms support concurrent multiple threads of execution. Some of these operating system platforms support concurrent multiple threads without complete scheduling control by the user. For example, operating system platforms that support the Java™ Virtual Machine Specification fall into this category. In such systems, each time a Java™ program runs, the time allocated to each unsynchronized thread may change as these times are under the control of an external operating system. The apparently random time allocation to threads introduces non-deterministic program behavior. Other events such as windowing events, network events/messages and general input output operations may also introduce non-deterministic program behavior. Such program execution is referred to below as a non-deterministic execution instance.

Such non-deterministic program behavior mitigates the benefits of using re-execution of the program for debugging, performance monitoring, or visualization, or other similar tasks.

For example, repeated execution of a program is common while debugging a program, and non-determinism may disallow a bug that appeared in one execution instance of the program from appearing in another execution instance of the same program. Non-determinism also affects visualization of the execution behavior of a program since execution behaviors can be different for different execution instances of the program. Current cyclic debugging, i.e., repeated execution for debugging, and monitoring-based tools such as visualizers, do not support deterministic re-execution.

Previously, techniques have been developed to deterministically replay a multithreaded distributed (e.g., Java™) program and implemented on Sun Microsystem's hardware/operating system platform (e.g., Sun's JDK 1.2). The replay mechanism developed was platform-independent. That is, it did not rely on the underlying operating system or thread scheduler.

However, such techniques were implemented on a single virtual machine. Hitherto the present invention, the techniques were not used in the context of shared memory multiprocessors. Moreover, while it is believed that such techniques could be implemented in a shared memory environment, the cost of increased instrumentation overhead would be prohibitive, absent some innovative techniques because such techniques rely on capturing and replaying thread schedule information.

On a uniprocessor system, when a thread or an application runs, all the other threads and applications "sleep", and replaying exact thread schedule information with synchronization information is sufficient for replaying execution behavior.

On a multiprocessor system, however, multiple threads and applications are concurrently running at any time point. Therefore, capturing thread schedule and synchronization information is not sufficient for replay, and any memory operation of each thread that might affect other threads or that might have been affected by other threads needs to be captured. Since there are a much larger number of such memory operations than the number of thread switches (e.g., thousands of times more in general), applying previous techniques to multiprocessors can incur prohibitive runtime costs.

Such techniques have been absent from the previous systems and mechanisms. Further, most previous approaches for re-execution of non-deterministic applications have focused on replaying multiprocessor applications running on shared memory multiprocessor system. Like threads, processes of an application can affect the execution behavior of other processes via accesses to shared variables, synchronization operations and communications. Replaying multiprocessor applications requires capturing interactions among processes (e.g., critical events) and generating traces for them. A major drawback of these approaches is the large overhead in time and space required to generate these traces.

To reduce the trace size, one approach assumes that applications use a correct, coarse-grained operation for concurrent-read-exclusive-write (CREW) to access shared objects and generates traces only for these coarse operations. However, this approach fails if critical events within the CREW are non-deterministic.

Another approach is similar in that it also generates traces only for coarse-grained critical events, assuming shared variables are well guarded within well-defined critical-sections.

Finally, another approach (optimal tracing) reduces the trace size further by applying an execution-time algorithm to find the minimum traces to replay the execution. This approach may significantly reduce the trace size (e.g., by one or two orders of magnitude), but at the cost of substantially increasing the execution time of the application.

SUMMARY OF THE INVENTION

In view of the foregoing and other problems of the conventional methods and structures, an object of the present invention is to provide a method and structure for deterministically replaying distributed (e.g., Java™) programs running on shared-memory multiprocessors (SMP) with minimum instrumentation overhead.

In a first aspect of the present invention, a method is provided of determinstically replaying an observable runtime behavior of distributed multi-threaded programs on multiprocessors in a shared-memory multiprocessor environment, wherein a run-time behavior of the programs includes sequences of events, each sequence associated with one of a plurality of execution threads. The method includes identifying an execution order of critical events of the program, wherein the program comprises critical events and non-critical events, generating groups of critical events of the program, generating, for each given execution thread, a logical thread schedule that identifies a sequence of the groups associated with the given execution thread, and storing the logical thread schedule for subsequent reuse.

With the invention, a method and structure are provided for deterministically replaying distributed (e.g., Java™) programs running on shared-memory multiprocessors (SMP) with minimum instrumentation overhead.

The present invention extends and leverages the existing system's (e.g., as described in U.S. patent application Ser. No. 08/956,717 which was directed to the above-mentioned replaying the threads in a uniprocessor) capabilities for optimization in a multiprocessor environment.

That is, in a uniprocessor, one may have many programs running, and many different threads running. However, there is only one CPU and thus while one program (e.g., Netscape or the like) or thread is running, the other applications or threads (e.g., WordPro, Excel, etc.) are "sleeping". In contrast, in a multiprocessor, multiple application programs (e.g., Netscape, WordPro, etc.) and multiple threads may be running at the same time because there are multiple CPUs (e.g., thread1 may run on CPU1, thread2 may be run on CPU2, etc.).

Thus, the invention solves a problem of synchronization (which is an expensive operation due to having to perform synchronization across multiple processors) of the updates which must be performed by including local and global counters as described in the co-pending application Ser. No. 09/520,008, incorporated herein by reference.

However, a key aspect of the present invention is the reduction of the number of events (e.g., critical events) which must be captured to perform the replay. The invention provides for such a reduction by performing (1) a global analysis to determine which variables are actually shared, and (2) "lazy writes" to "non-thread-local" variables at the next synchronization operation, and (3) "eager reads" from non-thread-local variables (i.e., non-thread-local variables) at the preceding synchronization operation. Capturing a reduced set of critical events allows minimizing the instrumentation required. A non-thread-local variable is a variable that can be accessed by more than one thread, and is either a static field of a class or a field of an object allocated on the heap. A static analysis (e.g., see Jong-Deok Choi et. Al, "Escape Analysis for Java", 1999 *ACM SIGPLAN Conference on Object-Oriented Programming Systems, Languages and Applications*, pages 1–19, Denver, Colo., November 1999.) can be used to identify "thread-local" objects, which are allocated on the heap but are accessed only by the thread that creates them. Fields of a thread-local object can be regarded as thread-local.

Thus, the invention reduces the number of critical events which must be captured. That is, if one knows that events are being captured and the variables therein, one can determine which are shared variables, and then the number of "shared variables" can be reduced. Thus, while a variable may appear to be a variable that is going to be shared, in reality it may not be. The program analysis can determine which variables are in fact "shared variables". As a result, the number of events which must be captured may be reduced.

Further, the Java™ memory model is advantageously used and considered. That is, the model is considered and specifically how the memory is being activated while a multithreaded program is executing. According to the Java™ memory model, a read from a global variable need be performed only if there is no read from the same variable since the last synchronization operation. Thus, by identifying the set of non-thread-local variables that have already been read from the global memory since the last synchronization operations, unnecessary reads from global memory can be avoided, thereby resulting in reduced number of critical events to be traced.

Furthermore, a static analysis can be used to determine what global variables might be read between a synchronization operation, say synch1, and the next synchronization operation, say synch2, during execution. Such an analysis can be used to eagerly read from the global variables at synch1, to eliminate any need for dynamically identifying reads from non-thread-local variables that have already been read since the last synchronization operation. This elimination will also result in better runtime performance.

Also, according to the Java™ memory model, a write to a global variable need not be performed until the next synchronization operation. Thus, by identifying the set of non-thread-local variables that need be written to the global memory at the next synchronization operations, and writing them only once at the next synchronization operation, unnecessary writes to global memory can be avoided, thereby resulting in a reduced number of critical events to be traced.

Furthermore, a static analysis can be used to determine what global variables might be written between a synchronization operation, say synch1, and the next synchronization operation, say synch2, during execution. Such an analysis can be used to eliminate any need for dynamically identifying writes to non-thread-local variables that need be written to global memory at the next synchronization operation. This elimination will also results in better runtime performance.

Thus, while synchronization is expensive, the approach of the invention reduces the cost by reducing the number of critical events which must be monitored (and thus the number of times the logical clocks must be updated).

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
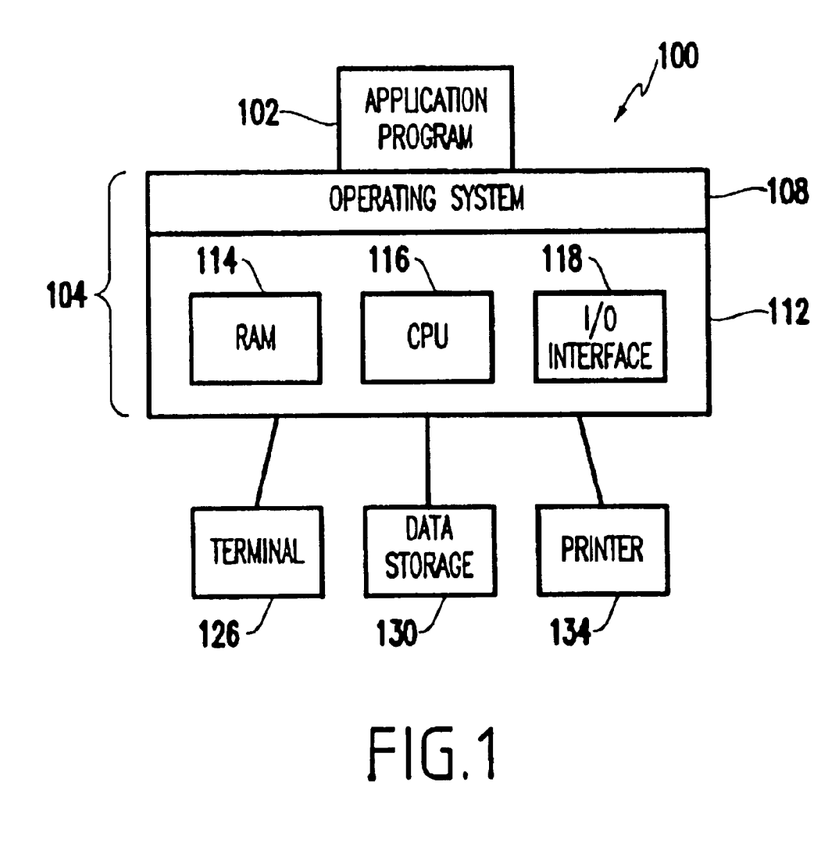
FIG. 1 illustrates an exemplary computer processing system on which the present invention may be implemented.

Referring now to the drawings, and more particularly to FIG. 1, there is shown a preferred embodiment of the method and structures according to the present invention.

Preferred Embodiment

Referring to FIG. 1, there is shown a block diagram of a computer system 100 on which a preferred embodiment of the present invention operates.

The computer system 100 includes one or more application programs 102 and an operating system 108 that operate on a computer platform 104. The platform 104 includes a hardware unit 112 that includes one or more central processing units (CPUs) 116 (which are typically referred to as CPUs/processors), a random access memory (RAM) 114, and an input/output interface 118.

Various peripheral components may be connected to the computer platform 104 including a terminal 126, a data storage device 130, and a printing device 134. The operating system 108 coordinates the operation of the various components or the computer system 100. An example of computer system 100 is the IBM RISC System/6000 (RISC System/6000 is a trademark of the IBM Corporation.) It is readily understood that those skilled in the computer arts will be familiar with many equivalent computer systems 100.

The operating system 108 of the present invention provides multi-threading capabilities wherein multiple concurrent threads of control are dispatched within a single shared address space. Examples include the built-in thread support of operating systems supporting the Java™ Virtual Machine, Microsoft's Windows NT® operating system, and the POSIX threads package that is available on many operating systems, for instance as the pthreads package of IBM's AIX® operating system.

According to the present invention, a software tool and method are provided that operate as an application program 102 on the computer platform of FIG. 1. The software tool provides the deterministic replay of a non-deterministic execution instance of a program. The software tool operates in two modes:

in a record mode, the tool records the logical thread schedule information of the execution while the program runs;

in a replay mode, the tool reproduces the execution behavior of the program by enforcing the recorded logical thread schedule information.

Replaying a multithreaded program involves capturing the thread schedule information during one execution of the program and reproducing the exact same schedule while replaying the execution. A thread schedule of a program is essentially a sequence of time intervals (time slices). Each interval in this sequence corresponds to the execution of a single thread. Thus, interval boundaries correspond to thread switch points. The thread schedule information obtained from a thread scheduler is referred to as a "physical thread schedule information", and each time interval in a physical thread schedule is referred to as a "physical schedule interval".

As mentioned above, the relative simplicity of the Java™ programming language and its platform API has made Java™ attractive as an application development platform. However, certain features of Java™, such as multiple threads and network events introduce non-determinism in an application's execution behavior. Non-deterministic execution behavior leads to difficulties in program understanding and debugging.

For example, as mentioned above, repeated execution of a program is common while debugging a program. However, non-determinism may result in a bug appearing in one execution instance of the program and not appearing in another execution instance of the same program. Further, the performance can be different from one execution of a program to another execution of the same program.

Providing deterministic replay of application execution is a key step towards programmer productivity and program understanding (e.g., see Anne Dinning and Edith Schonberg, "An empirical comparison of monitoring algorithms for access anomaly detection", *Second ACM SIGPLAN Symposium on Principles and Practice of Parallel Programming*, pages 1–10, Seattle, Wash., March 1990. ACM Press; Thomas J. Leblanc and John M. Mellor-Crummy. "Debugging parallel programs with instant replay", *IEEE Transactions on Computers*, C-36(4):471–481, April 1987; and Mark Russinovich and Bryce Cogswell, "Replay for concurrent non-deterministic shared memory applications", *Proceedings of ACM SIGPLAN Conference on Programming Languages and Implementation (PLDI)*, pages 258–266, May 1996). Towards this goal, the present inventors developed a replay framework based on logical thread schedules and logical intervals.

The optimization for the shared memory multiprocessors (SMPs) described hereinbelow is based on the rules in the Java™ language specification for interaction of threads with main memory.

Below, a brief overview of Java's memory model as discussed in the Java™ language specification, and the replay mechanism according to the present invention are described.

It is noted that while the Java™ program is mentioned specifically herein, the present invention is not strictly limited to implementation with the Java™ program. Indeed, the present invention can be tailored, as would be known by one of ordinary skill in the art in the context of the present application, to be operable with other distributed programs running on a platform with a memory model similar to that of Java™.

An example of the benefits of the invention will be provided prior to describing the method and structure.

Assume thread t1 is running on CPU1 and thread t2 is running on CPU2, then assume that they have one interval on each thread called a "synchronization interval" between two synchronization operations. A lock is employed to mark the beginning of a synchronization interval and an "unlock" is employed to mark the end of a synchronization interval. For example, the lock can be acquired and released as described in the above-mentioned copending U.S. patent application Ser. No. 08/956,717 and shown in FIG. 5 thereof.

Then, for thread t1 running on CPU1, there is a lock operation (object) and an unlock operation (object) to define one interval. Similarly, thread2 running on CPU2 will have a similar "lock" and "unlock" operation. In a multiprocessor environment with many threads running simultaneously, there may be an overlap between two intervals. Such an overlap will never occur in a uniprocessor since only one thread at a time may be running (e.g., the other threads are sleeping).

Now assume that in each interval there are many (e.g., 100) statements being executed such as reads and writes, etc. each having global variables. Assuming that each are reading and writing the same global variables, then in a worst case, one must record 200 events since it cannot be determined which read and which write will change the variables and in which the result will be different. Thus, the number of critical events is large and the cost is high since each statement/critical event must be recorded.

An aspect of Java™ used by the present invention is that when thread t1 reads the global variable and later updates the global variable within the same synchronization interval/ operation, even though it obtains the global variable it does not necessarily have to update the value in the global location in which other threads can read it.

Thus, a local working copy of the variables is created for reads/writes during the synchronization interval and the variables need not be updated during the interval. The variables are updated (e.g., global copy) only at the end of the synchronization interval (when the interval terminates). The same operation occurs for thread t2.

Thus, when t1 and t2 read and write the global location, the program can be run with each thread accessing/reading the global location for variables and obtaining (storing) the variables for their local working copy. The variables in the local copy of each thread can be used over and over again until the interval terminates. Therefore, in the above example, the number of accesses to the global variables by thread t1 and t2 each can be reduced to two accesses/updates each. Instead of 200 accesses/updates with the conventional process, a total of only four accesses/updates would be required by threads t1 and t2. Hence, the number of updates (critical events) can be reduced.

Thus, in the Java™ memory model, every thread has a working memory where it keeps its working copy of variables.

As the thread executes, the thread will update and access variables from its working copy. The master copy of variables is located in main memory of the central processing system. The master copy of variables is updated at specific points during a thread's execution. It is noted that the Java™ memory model allows for this, and it is up to each specific implementation of Java™ virtual machine whether to operate in this way or not. The present invention hinges on a particular way of implementation that, at each synchronization point, (1) eagerly reads in global variables that will be read by the application between the synchronization point and the next synchronization point, and (2) lazily writes to the global memory all the modification done to the local copy of the global memory locations between the last synchronization point and the current synchronization point. Communication between Java™ threads is accomplished via shared variable updates to main memory by the different threads.

When a thread is created, conceptually, it obtains a copy of all variables in main memory and stores them in its local working copy.

An efficient Java™ Virtual Machine (JVM) implementation loads a variable into a thread's local working copy when the variable is read for the first time after a thread creation of after a beginning of a synchronization interval. Any writes to the variables are updates to this local copy and any further reads are reads from this local copy, until a synchronization operation in or thread termination, whichever occurs first.

A monitorEnter synchronization operation flushes all the variables from the thread's working memory. A monitorEnter sync operation occurs when the application starts executing a synchronized block or a synchronized method.

A monitorExit synchronization operation copies all assigned values in the thread's working memory back out to main memory. That is, only changed variables need to be copied, but others may be copied without violating the Java™ memory model. A monitorExit sync operation occurs when the application terminates executing a synchronized block or a synchronized method. The rule for volatile variables (e.g., those to specifically prevent lazy read/write that one would like to exploit for efficient tracing) is different, in that any access or update of such variables are always from or to main memory, not from the thread's working memory. Volatile variables are recognized by the model since the application should declare in the program which variables are volatile, e.g., int volatile x.

Figure 2:
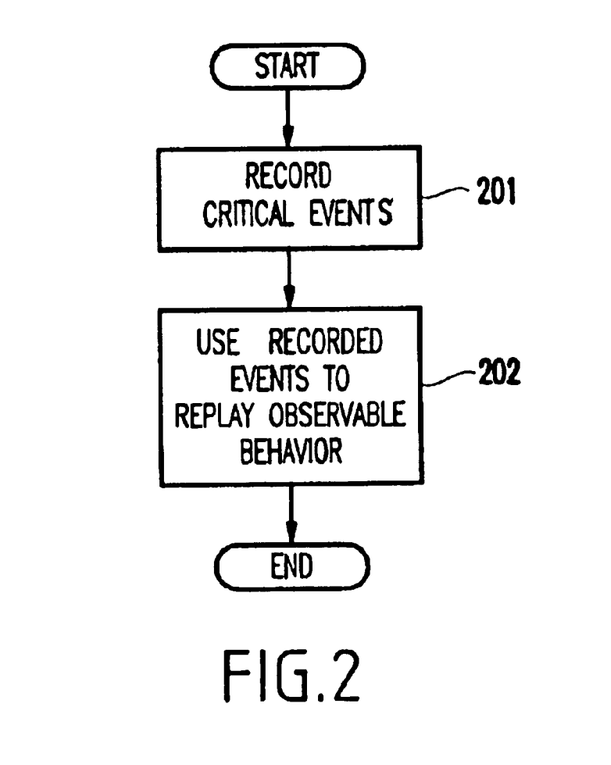
FIG. 2 illustrates a flowchart of the method of deterministically replaying multithreaded programs on a processor according to a previous method.

Replay of Multithreaded Java™ Programs:

Turning now to a detailed discussion of the method and structure for replaying multithreaded Java™ programs on multiprocessors, and referring to the flowchart of FIG. 2, to replay the observable behavior of multithreaded programs, the previous approach (e.g., see U.S. patent application Ser. No. 08/956,717 incorporated herein by reference) has been to record in one phase (e.g., the record phase), the "critical events" in the program in the order in which they executed (e.g., step 201).

Then, the replay phase (e.g., step 202) uses the recorded events to enforce the exact same observable behavior of the program. "Critical events" are those that affect the observable behavior (e.g., shared variable updates, synchronization operations, input/output I/O operations (which include AWT, network I/O and file I/O)).

Hereinbelow, the description of the present invention will focus on shared variables and synchronization operations, but of course I/O operations are equally pertinent as well and will find great benefit with the present invention.

The previous replay mechanism has proven to be very effective on uniprocessor platforms and does not require any support from the operating system. For purposes of the present application, a "uniprocessor" is defined as a computer system with only one CPU (central processing unit) for the application to run on. In particular, for many Java™ programs that have many shared variable updates and synchronization operations, the present inventors have noted at most an 80% reduction in execution speed due to the instrumentation that was added to replay the program.

Figure 3:
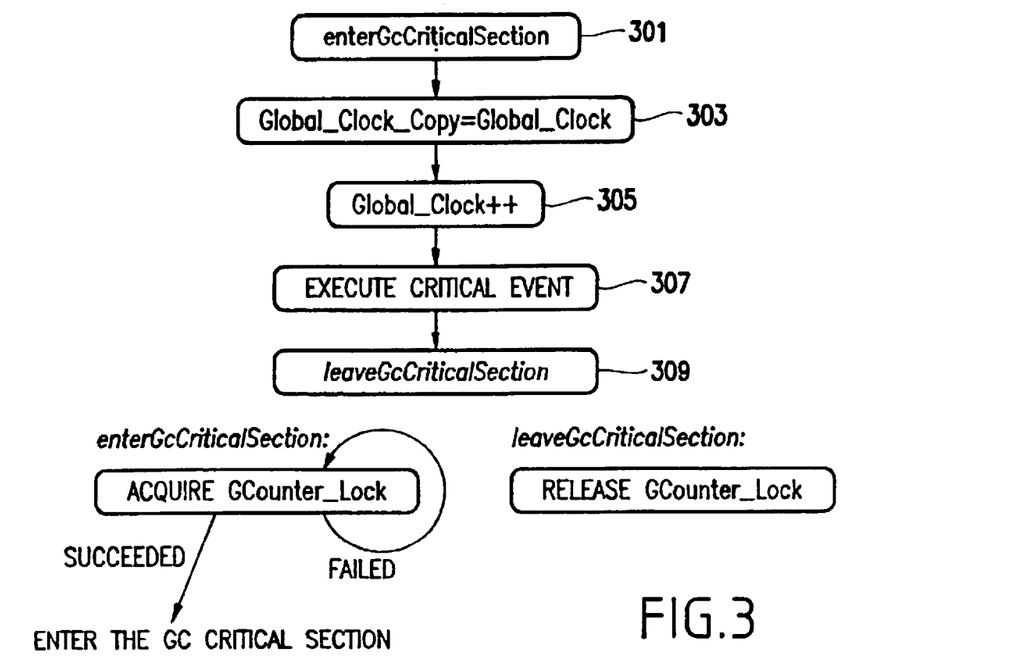
FIG. 3 illustrates the operations for performing an atomic update for critical events that represent shared variables.

The instrumentation overhead is caused mainly by the atomic update of the invention's "logical clocks" at critical events. An example of the operations in performing such an atomic action, denoted a GcCriticalSection, is illustrated in FIG. 3. In Steps 301 and 309, the thread acquires and releases, respectively, a global lock (GCounter_Lock). One way to implement the global lock of steps 301 and 309 is to define a variable GCounter_Lock that when set to '0' indicates that no thread holds the global lock and when set to '1' indicates that a thread holds the global lock. The current thread acquires the global lock in step 301 by performing a loop that waits until GCounter_Lock is set to '0'; and upon determining that the GCounter_Lock is set to '0', sets it to '1' and exits the loop. To release the global lock in step 309, the thread sets GCounter_Lock to '0'.

Once a thread (thread [i]) acquires a global lock (GCounter_Lock), no other thread can acquire the global lock until thread [i] releases the global lock (i.e., by completing execution of step 309). This ensures that the operations between steps 301 and 309 (i.e., steps 303,305,307) are atomic. In step 303, a local copy of the GLOBAL_CLOCK, denoted GLOBAL_CLOCK_COPY, is assigned to the current value of GLOBAL_CLOCK. In step 305, GLOBAL_CLOCK is incremented. In step 307, the critical event is executed.

The operations of FIG. 3 are applicable to critical events that represent a shared variable access. However, such operations may not be directly applicable to all other critical events, namely some synchronization operations because of the semantics of such synchronization operations. For example, the semantics of the synchronization operations supported by a Java™ Virtual Machine may require modifications to the operations outlined above in FIG. 3.

More specifically, the Java™ Virtual machine supports synchronization blocks and methods that correspond to user-defined critical sections. The implementation of such critical sections is done using the monitorenter and monitorexit operations that lock and release respectively an event object. The operations of FIG. 3, when applied to these operations, could result in deadlock situations. This is because, by definition of monitorenter and monitorexit semantics, only one thread can reside in the monitor.

Thus, these logical clocks maintain the ordering of the various critical events program execution and are essential in reproducing the exact same execution behavior in the replay phase.

In the multiprocessor case (e.g., the present invention), these atomic updates are even more expensive as locks have to be maintained across multiple processors.

Although the present concepts have not been implemented on a multiprocessor Java™ Virtual Machine, it is believed that the performance overhead may be more severe.

The Method of the Invention

Figure 4:
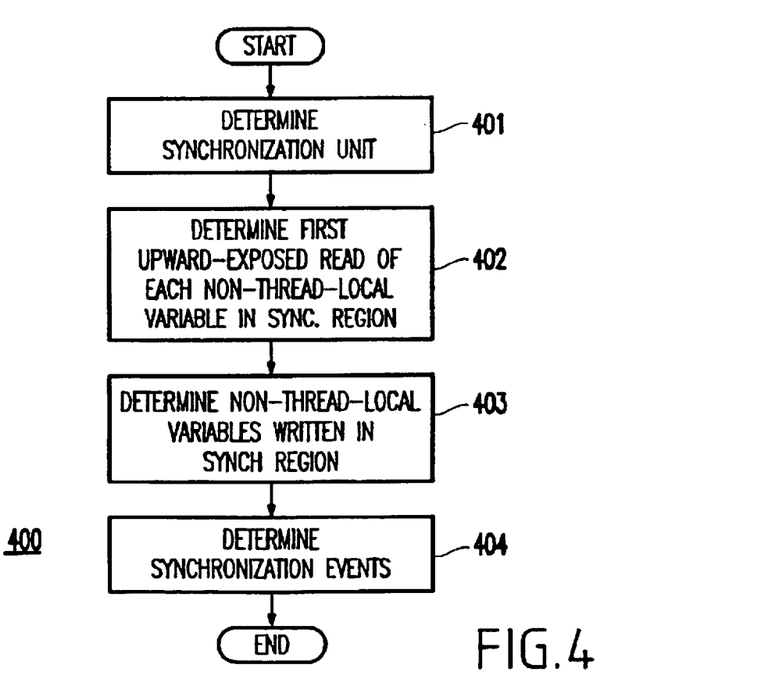
FIG. 4 illustrates a flowchart of the inventive method.

Referring to FIG. 4, the method 400 according to the present invention for replaying deterministic behavior in a multiprocessor environment is shown.

Hereinbelow, it is discussed how to optimize the instrumentation cost.

More particularly, the invention leverages the Java™ thread and memory semantics to reduce the instrumentation overhead. The present invention uses the concept of a "Synchronization Region", which is a representation used to identify at what points in a thread's execution trace should instrumentation be inserted. The Synchronization Region is used to optimize the replay mechanism of the present invention.

Synchronization Region:

A trace, S=<F, L>, of a thread in a program's execution is a sequence of critical events and is determined in step 401 of FIG. 4 in determining a synchronization unit. The trace is in the form of a tuple, as shown above. The first event, F, in the trace is the thread_start event and the last event, L, in the trace is the thread_end event., Other critical events include monitorEnter events, monitorExit events and shared variable accesses. A synchronization event is a monitorEnter, monitorExit, thread_start or thread_end event.

A synchronization region S'=<F', L'> in a trace is a subsequence of the trace, S=<F, L>, such that:

1. The first event F' of the trace S' is a synchronization event;
2. The last event L' of the trace S' is a synchronization event; and
3. There are no synchronization events between F' and L'.

Thus, the sync unit is determined for the trace in step 401. The replay mechanism of the present invention conforms to the Java™ memory semantics. It also updates the main memory only at synchronization events, i.e., performs lazy stores, which is an implementation of the Java™ memory model. For purpose of the present application, a "lazy store" is defined as an operation that holds back stores into global memory locations until the following synchronization operation. For such an implementation, the only accesses of shared variables that affect the observable behavior of multithreaded Java™ programs and hence, deterministic replay, are the following:

1) first upward-exposed read of each non-thread-local variable within each synchronization region (step 402);
2) non-thread-local variable written in the synchronization region (step 403); and
3) synchronization events, where lazy stores are performed, and in which synchronization events and the corresponding lazy stores are tightly coupled (step 404).

By capturing and replaying the ordering of the above events, correct deterministic replay of multithreaded Java™ programs can be ensured.

The implementation of the replay mechanism according to the present invention will be discussed below.

Lazy Stores Implementation:

A straightforward implementation is to mark the variables assigned within the synchronization region and to write them into main memory at the closest following synchronization event. For example, consider the following synchronized method:

```
synchronized void m1(T1 o1) {
    S1: int x = o1.a + 1;
    S2: int y = o1.a + 100;
    S3: o1.b = o1.a * 200;
    S4: x = y + o1.a;
    S5: o1.b = x + y;
}
```

In the above example, S1, S2, and S3 all read from the same global memory location o1.a. Among the three, only the first (S1) actually need be read from the global memory location. The other two can use the value read at the first (S1). S3 and S5 both write to the same global memory location o1.b. However, both can be written to a local copy of o1.b, which need be written to the global memory location only once at the end of the synchronized method. A synchronized block has a similar property.

A static analysis can be used to identify each non-thread-local variable that is upward-exposed used in a synchronization region. The compiler can (1) generate code right after the synchronization operation to read each such variable into a local copy, and (2) transform each upward-exposed use into reading from the local copy. This will reduce the runtime overhead of identifying during runtime whether a read is an upward-exposed use (which needs to read from the global memory) or not.

Recording Upwards-Exposed Uses:

Every first upwards-exposed read of a variable within the synchronization region should become a synchronization event (e.g., step 402). That is, according to the Java™ memory semantics, a read after a synchronization operation not preceded by another read of the same memory after the synchronization should read it from the global memory. A straightforward implementation is to check if each read access is the first access of the variable in the synchronization region.

Support by Static Analysis of the Application:

To further reduce the overhead of main-memory update at a synchronization event, the results of a whole-program static analysis on the application can be used.

The above example shows such a case. Without a whole program analysis performed statically before the execution, each of the three reads at S1, S2, S3 needs to check whether it is the first read of a variable after the synchronization operation or not, which can be expensive.

With a static analysis, as described above right after the example, the compiler can determine before execution that only S1 is the first upward-exposed use that needs to read from the global memory. S2 and S3 can read from the local copy into which S1 put the value it read. Since no dynamic checking is necessary, it is more efficient.

Furthermore, multiple read operations of upward-exposed uses can be coalesced into one right after the synchronization operation, instead of multiple, separate reads one at each first upward-exposed read. Performing a coalesced memory read of multiple memory locations usually results in better performance in the memory operation. It also definitely reduces the number of critical events since multiple critical events for multiple upward-exposed uses in a synchronization region are merged into the single critical event of the synchronization operation.

The whole-program static analysis is performed before executing the program under the distributed Java™ Virtual Machine. The static analysis helps identify the shared variables that may be accessed in the synchronization region. A similar analysis can be used to identify upwards-exposed uses of shared variables in a synchronization region. These shared variables can be loaded into the local memory (of the virtual machine) at the beginning of the synchronization region. This static analysis can be combined with run-time checking to refine the set of shared variables whose accesses need to be recorded for the Java™ Virtual Machine.

Other Java™ Synchronization Operations:

The obj.wait( ) method is enclosed in a synchronized method (implemented using monitorEnter and monitorExit).

The semantics of obj.wait( ) is that just before the thread executing the wait suspends execution, it releases the object (obj) that it has currently locked. The object is released via a monitorExit operation.

When the thread is notified and its execution can resume, it executes a monitorEnter on the object in order to reenter the synchronized method. Hence, wait( ) is instrumented by the inventive replay mechanism by simply instrumenting all monitorEnter and monitorExit operations.

Clearly, the number of instrumentation points is dramatically reduced by the optimization suggested above and the present invention. Although, in the multiprocessor environment, the all atomic update of the logical clocks is implemented at each of these instrumentation points, since the number of such points is much lower now, the overall instrumentation overhead is decreased. The Java™ language semantics allows the opportunity to perform such optimization because it allows for lazy stores and also eager reads.

Further, while there is a large volume of work in the area of deterministic replay of parallel programs on multiprocessor platforms, none of the work has focussed on Java™. Although some methods may apply to Java™, they are still quite inefficient compared to the replay mechanism according to the present invention.

Figure 5:
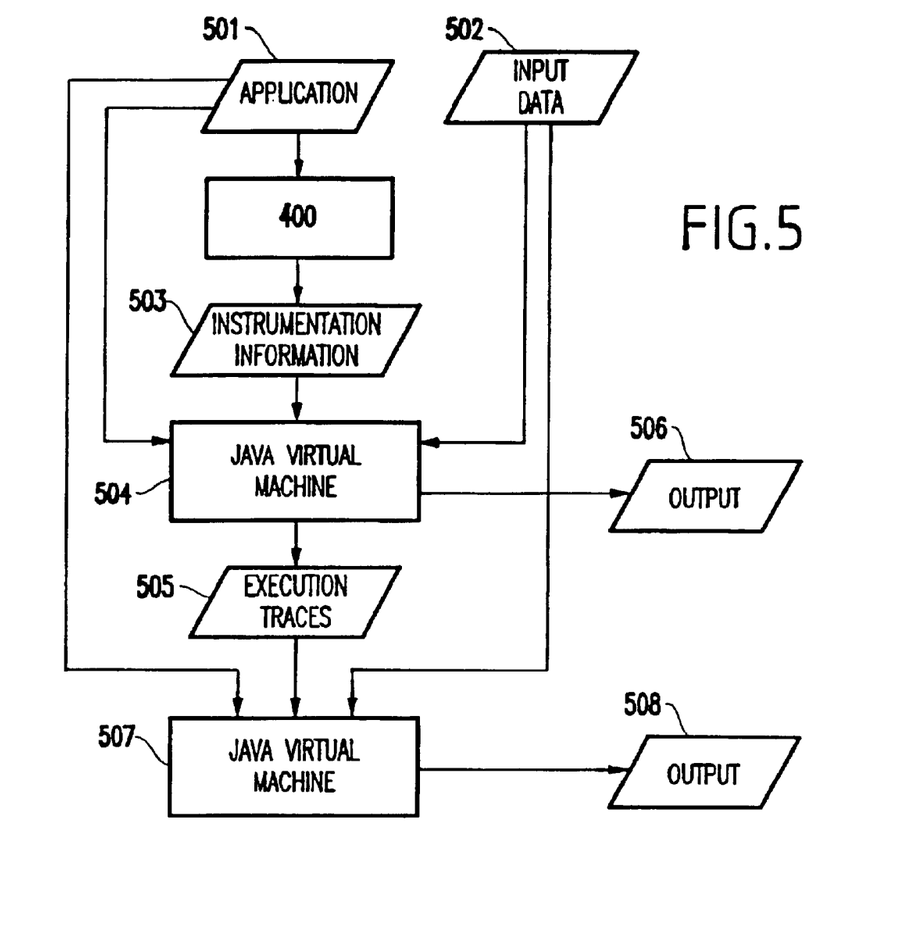
FIG. 5 illustrates the software tool according to the present invention in a replay mode and in a record mode.

FIG. 5 illustrates the deterministic replay mechanism in a record mode and a replay mode 507. In the record mode, the JVM 504 receives an application 501 and input data 502. Method 400 is performed and an input is made with instrumentation information 503. As a result, the JVM provides an output 506.

In the replay mode, a JVM 507 receives an Application 501, input data 502, and an execution trace 505 from JVM 504. As a result, the JVM 507 provides output 508.

Figure 6:
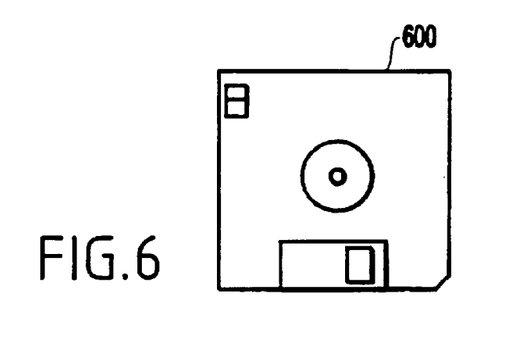
FIG. 6 illustrates a programmable storage medium 600 for storing a program of the method according to the present invention.

As shown in FIG. 6, in addition to the hardware and process environment described above, a different aspect of the invention includes a computer-implemented method for recording and replaying execution of the distributed Java™ programs, as described above. As an example, this method may be implemented in the particular hardware environment discussed above with regard to FIG. 1.

Such a method may be implemented, for example, by operating the CPU 116 (FIG. 1), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 116 and hardware above, to perform a method of recording and replaying execution of distributed Java™ programs.

This signal-bearing media may include, for example, RAM 114 contained externally or within the CPU 116, as represented by fast-access storage for example. Alternatively, the instructions may be contained in another signal-bearing media, such as data storage 130 (FIG. 1) or a magnetic data storage diskette 600 (FIG. 6), directly or indirectly accessible by the CPU 116.

Whether contained in the diskette 600, the computer 100, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, while the invention has been described in terms of a single preferred embodiment, those skilled in the art will recognize that the invention can be practiced with modification within the spirit and scope of the appended claims.

What is claimed is:

1. A method of determinstically replaying an observable run-time behavior of distributed multi-threaded programs rug on multiprocessors in a shared-memory multiprocessor environment, wherein a run-time behavior of said programs includes sequences of events on each processor, each sequence being associated with one of a plurality of execution threads, said method comprising:

identifying an execution order of critical events on each processor of said program, wherein said program comprises critical events and non-critical events;

generating groups of critical events on each processor of said program;

for each given execution thread, generating a logical thread schedule that identifies a sequence of said groups of critical events on each processor associated with said given execution thread in said shared-memory multiprocessor environment;

storing said logical thread schedule of each processor for subsequent reuse; and determining accesses of shared variables affecting deterministic replay, including a first upward-exposed read of each non-thread-local variable within a synchronization region, non-thread-local variables written in said synchronization region, and synchronization events.

2. The method according to claim 1, wherein said critical events comprise events that affect the observable run-time behavior, including a shared variable update, a synchronization operation, and an input/output operation.

3. The method according to claim 1, wherein a logical global clock is provided for each virtual machine of said shared-memory multiprocessor environment and a logical local clock is provided for each thread, and wherein an atomic update of said logical clocks is performed at said critical events, wherein said logical clocks maintain an ordering of critical events program execution.

4. The method according to claim 1, wherein locks are provided for each thread of program execution and are maintained across multiple processors in said multiprocessor environment.

5. The method according to claim 1, further comprising:
determining a sychronization region for a trace, said synchronization region being a representation for identifying at what points in a thread's execution trace instrumentation should be inserted.

6. The method according to claim 5, wherein said trace S=<F, L>, of a thread in a program's execution comprises a sequence of said critical events,
wherein first event, F, in the trace is the thread_start event and the last event, L, in the trace is the thread_end event.

7. The method according to claim 1, wherein said critical events include monitorenter events, monitorexit events and shared variable accesses.

8. The method according to claim 1, wherein said synchronization event comprises a monitorEnter, monitorExit, thread_start and thread_end event.

9. The method according to claim 5, wherein a synchronization region S'=<F', L'> in a trace comprises a subsequence of the trace, S=<F, L>, such that a first event F' of the trace S' comprises a synchronization event, a last event L' of the trace S' comprises a synchronization event, and there are no synchronization events between F' and L'.

10. The method according to claim 1, wherein said replay mechanism updates a main memory of a processor only at synchronization events.

11. The method according to claim 1, wherein said synchronization events comprise synchronization events where lazy stores are performed, and in which synchronization events and the corresponding lazy stores are tightly coupled.

12. The method according to claim 1, wherein by capturing and replaying an ordering of the critical events, said deterministic replay of multithreaded programs is ensured.

13. The method according to claim 1, further comprising:
marking variables assigned within said a synchronization region and writing them into a main memory at a next synchronization event.

14. The method according to claim 1, further comprising:
recording upwards-exposed uses, wherein every first upwards-exposed read of a variable within the synchronization region comprises a synchronization event.

15. The method according to claim 14, wherein said recording includes determining whether each read access comprises a first access of the variable in the synchronization region.

16. The method according to claim 1, further comprising:
performing a whole-program static analysis on an application to reduce an overhead of a main-memory update at a synchronization event,
wherein said analysis is performed before executing the program under a distributed Virtual Machine of said multiprocessor environment,
wherein the static analysis identifying the shared variables that can be accessed in the synchronization region and identifying upwards-exposed uses of shared variables in a synchronization region, and
wherein said shared variables are loaded into the local memory of the virtual machine at a beginning of the synchronization region.

17. The method according to claim 16, further comprising:
performing run-time checking with said static analysis to refine the set of shared variables whose accesses are recorded.

18. The method according to claim 1, further comprising:
determining a synchronization interval between two synchronization operations for a thread on said distributed program.

19. The method according to claim 18, further comprising:
utilizing a lock to mark a beginning of a synchronization unit and an unlock mark the end of said synchronization unit.

20. The method according to claim 19, wherein an overlap exists between two synchronization intervals.

21. The method according to claim 20, wherein when a first thread reads a global variable in a synchronization interval and later modifies the global variable within the same synchronization interval, said global variable is not necessarily updated at a global location in which other threads can read said global variable.

22. The method according to claim 21, wherein a local working copy of the variables is created for accesses during the synchronization interval and wherein the variables are not updated during said synchronization interval, and
wherein said variables are updated only at the end of the synchronization interval.

23. The method according to claim 22, wherein global variables are obtained by a thread for storage in a local working store of said thread,
wherein said variables in the local copy of each thread are reusable until the interval terminates.

24. The method according to claim 1, wherein every thread has a working memory for keeping its working copy of variables, such that as said thread executes, the thread updates and accesses variables from its working copy.

25. The method accruing to claim 1, wherein a master copy of variables is located in a main memory of a central processing system of the multiprocessor environment, and is updated at specific points during a thread's execution,
wherein communication between different threads is accomplished via shared variable updates to main memory by the different threads.

26. The method according to claim 25, wherein when a thread is created, said thread obtains a copy of all variables in said main memory and stores them in its local working copy.

27. The method according to claim 26, wherein a variable is loaded into a thread's local working copy when the variable is read for the first time, and
wherein writes to the variables are updates to said local copy and any subsequent reads are reads from said local copy, until one of a synchronization operation or a thread termination first occurs.

28. The method according to claim 27, wherein a monitorEnter synchronization operation flushes all the variables from the threads working memory.

29. The method according to claim 1, wherein each of said critical events represents one of a shared-variable access operation and a synchronization operation.

30. The method according to claim 1, wherein critical events of a processor belonging to a given group are represented by an ordered pair <FirstCriticalEvent, LastCriticalEvent>, wherein FirstCriticalEvent identifies the first critical event in the given group and LastCriticalEvent identifies the last critical event in the given group.

31. A method of determinstically replaying an observable run-time behavior of distributed multi-threaded programs running on multiprocessors in a shared-memory multiprocessor environment, wherein a run-time behavior of said programs includes sequences of events on each processor, each sequence associated with one of a plurality of execution threads, said method comprising:
   identifying an execution order of critical events on each processor of said program, wherein said program comprises critical events and nor-critical events;
   determining, for each thread of said program, a thread's execution trace;
   for each thread's execution trace, determining a synchronization region of the trace;
   determining a first upward-exposed read of each non-thread-local variable in said synchronization region;
   determining each non-thread-local variable written in said synchronization region;
   determining synchronization events; and
   determinstically replaying said multi-threaded programs in said shared-memory multiprocessor environment.

32. A program storage device, readable by a machine, tangibly embodying instructions to perform method steps for determinstically replaying an observable run-time behavior of distributed multi-threaded programs running on multiprocessors in a shared-memory multiprocessor environment, wherein a run-time behavior of said programs includes sequences of events on each processor, each sequence associated with one of a plurality of execution threads, said method comprising:
   identifying an execution order of critical events on each processor of said program, wherein said program comprises critical events and non-critical events;
   generating groups of critical events of said program;
   generating, for each given execution thread, a logical thread schedule that identifies a sequence of said groups of critical events on each processor associated with said given execution thread in said shared-memory multiprocessor environment;
   storing said logical thread schedule for subsequent reuse; and
   determining accesses of shared variables affecting deterministic replay, including a first upward-exposed read of each non-thread-local variable within a synchronization region, non-thread-local variables written in said synchronization region, and synchronization events.

33. A program storage device, readable by a machine, tangibly embodying instructions to perform method steps for determinstically replaying an observable run-time behavior of distributed multi-threaded programs running on multiprocessors in a shared-memory multiprocessor environment, wherein a run-time behavior of said programs includes sequences of events on each processor, each sequence associated with one of a plurality of execution threads, said method comprising:
   identifying an execution order of critical events on each processor of said program, wherein said program comprises critical events and non-critical events;
   determining, for each thread of said program, a thread's execution trace;
   for each thread's execution trace, determining a synchronization region of the trace;
   determining a first upward-exposed read of each non thread-local variable in said synchronization region;
   determining each non-thread-local variable written in said synchronization region;
   determining synchronization events; and
   deterministically replaying said multithreaded programs in said shared-memory multiprocessor environment.

34. A system for determinstically replaying an observable run-time behavior of distributed multi-threaded programs running on multiprocessors in a shared-memory multiprocessor environment, wherein a run-time behavior of said programs includes sequences of events on each processor, each sequence being associated with one of a plurality of execution threads, said system comprising:
   means for identifying an execution order of critical events on each processor of said program, wherein said program comprises critical events and non-critical events;
   means for generating groups of critical events on each processor of said program;
   means for generating, for each given execution thread, a logical thread schedule that identifies a sequence of said groups of critical events on each processor associated with said given execution thread in said shared-memory multiprocessor environment;
   a storage for storing said logical thread schedule for subsequent reuse and
   determining accesses of shared variables affecting deterministic replay, including a first upward-exposed read of each non-thread-local variable within a synchronization region, non-thread-local variables written in said synchronization region, and synchronization events.

35. A system for determinstically replaying an observable run-time behavior of distributed multi-threaded programs running on multiprocessors in a shared-memory multiprocessor environment, wherein a run-time behavior of said programs includes sequences of events on each processor each sequence associated with one of a plurality of execution threads, said system comprising:
   means for identifying an execution order of critical events on each processor of said program, wherein said program comprises critical events and non-critical events;
   means for determining, for each thread of said program, a thread's execution trace;
   means for determining a synchronization region of the trace;
   means for determining, for said each thread's execution trace, a first upward-exposed read of each non-thread-local variable in said synchronization region;
   means for determining each non-thread-local variable written in said synchronization region;
   means for determining synchronization events; and
   means for deterministically replaying said multi-threaded programs in said shared-memory multiprocessor environment.

* * * * *